July 9, 1940.  W. BLUME  2,207,453
AIRCRAFT SUPPORTING WING
Filed Aug. 29, 1938　　2 Sheets-Sheet 1
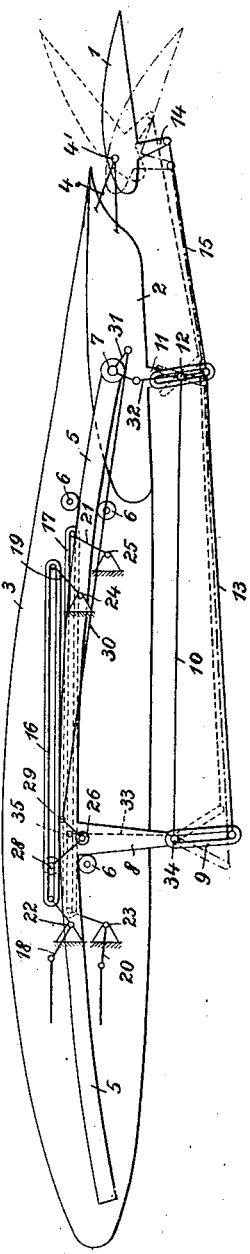
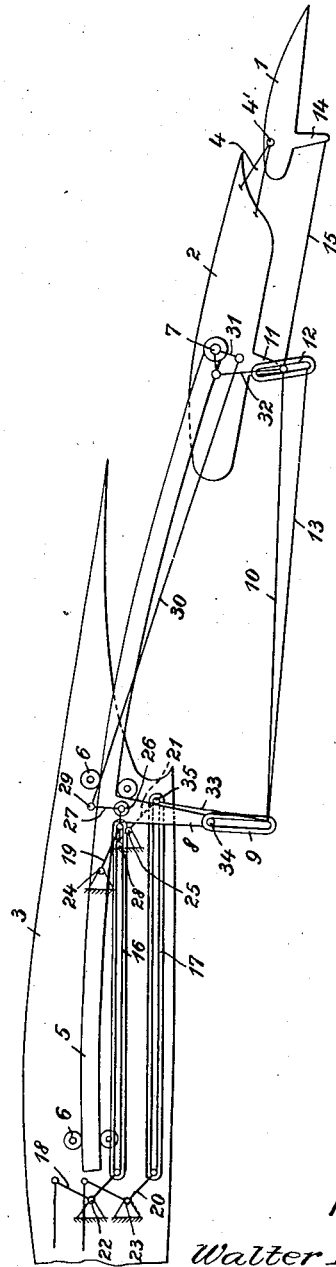
Inventor
Walter Blume,
By
Attorneys

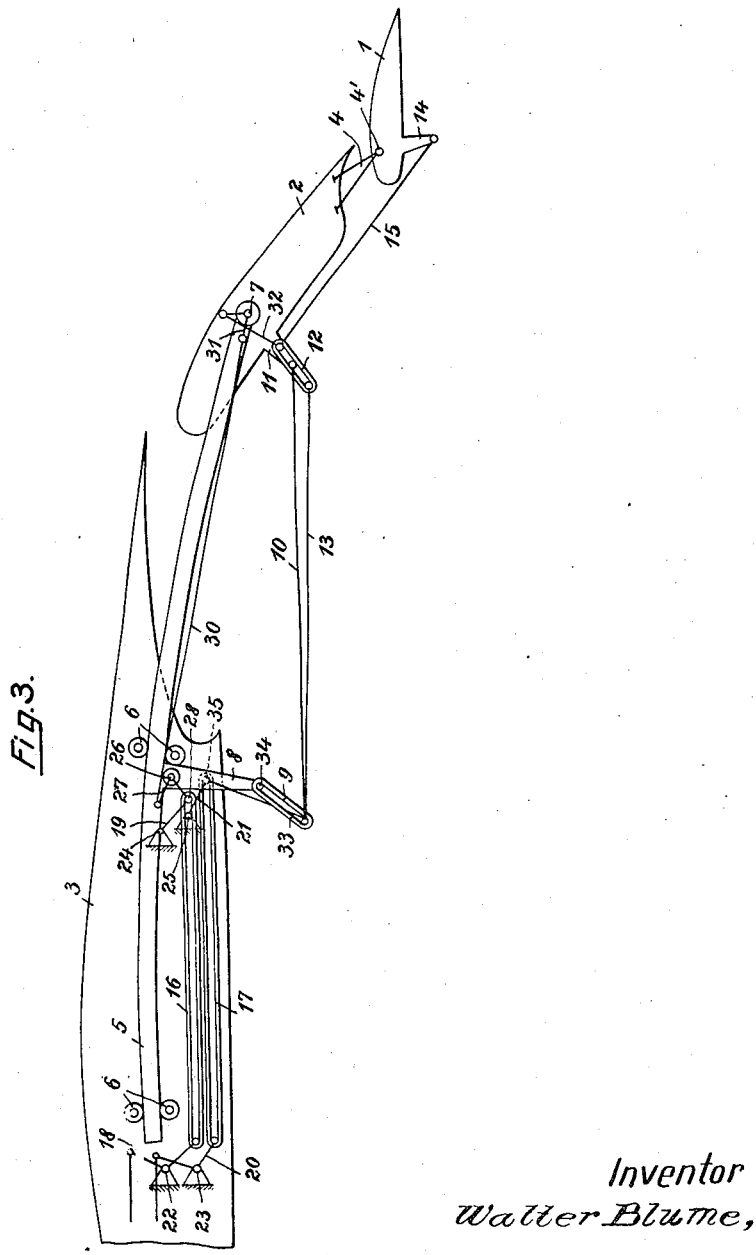

Patented July 9, 1940

2,207,453

UNITED STATES PATENT OFFICE 2,207,453

AIRCRAFT SUPPORTING WING

Walter Blume, Brandenburg, Germany, assignor of one-half to Arado Flugzeugwerke Gesellschaft mit beschrankter Haftung, Brandenburg (Havel), Germany, a German company Application August 29, 1938, Serial No. 227,393
In Germany October 2, 1937

6 Claims. (Cl. 244—42)

The invention relates to a supporting wing for aircraft with two auxiliary wings adapted to be swung out of a recess provided beneath the rear part of the main wing.

The invention has for its object to provide an arrangement which permits of so combining the increase of surface depth with the lateral control (banking) that both in the retracted position and also in the protruded position of the two auxiliary wings lateral control (banking) is possible.

As distinguished from known supporting wings for aircraft equipped with auxiliary wings, the invention presents the advantage that with a maximum increase of the surface depth, which is naturally more effective with two auxiliary wings than with one, also the most effective aileron adjustments are rendered possible.

The invention consists mainly in the feature that, in the retracted position of the two auxiliary wings, the rear wing of the pair and, in the protruded position, also both wings together or only one or other is or are rotatable downwardly or upwardly from its initial position as an aileron. Further features of the invention will appear from the following description of the embodiment illustrated in the accompanying drawings.

In the drawings Fig. 1 shows the new arrangement of the supporting wing in one position in which the two auxiliary wings are retracted.

In Fig. 2 the two auxiliary wings are shown in protruded position without being shifted relatively to one another.

Fig. 3 shows the two auxiliary wings in protruded position in which they are also shifted relatively to one another and to the main supporting wing.

Referring to the drawings, 1 denotes the rearward auxiliary wing, and 2 the forward auxiliary wing considered in the direction of flight. 3 denotes the supporting wing proper of the aircraft. The rear auxiliary wing 1 is pivotally mounted on the forward wing 2 on a shaft 4' disposed transversely to the direction of flight. The shaft 4' is mounted in a suitably formed bracket 4 which is rigidly secured to the auxiliary wing 2.

The forward auxiliary wing 2 is rotatably mounted on a shaft 7 which is fitted on the rear ends of slide rails 5 which in turn are slidable in the supporting wing 3 between rollers 6. Each rail 5 is provided with an arm 8 on the free end of which is rockably mounted a one-armed lever 9 for effecting lateral control.

The lever 9 is provided over its entire length with a slot in which is slidably fitted the front end of the push rod 10. To this end there is pivotally connected a rod 33, which at its upper end carries a roller 35 running in the rail 17. The rear end of the rod 10 is pivotally but nonslidably mounted in the lower end of an arm 11 which is secured to the auxiliary wing 2. On the lower end of the arm 11 there is also rockably mounted a double-armed lever 12 which is likewise provided with a slot over its entire length. The lever 12 is engaged by one end of a rod 13, the engagement being pivotal only. The forward end of the rod 13 is rotatably but non-slidably mounted on the lower end of the lever 9.

Secured to the rear auxiliary wing 1 is an arm 14 to the lower end of which is pivoted a rod 15. The forward end of the rod 15 is slidably mounted in the slotted lever 12.

There are also provided two guide rails 16 and 17 which are adapted to be swung up and down by the aid of levers 18, 19 and 20, 21. The levers 18, 20 are formed as bell-cranks and are pivoted in fixed bearings 22 and 23. The levers 19 and 21 are pivoted in bearings 24 and 25. On the slide rail 5 is arranged a bearing 26 in which is pivotally mounted a bell-crank lever 27. One free end of this lever 27 carries a roller 28 which is slidable in the rail 16. The other free end 29 of the lever 27 is pivotally connected with one end of a rod 30, the other end of which is pivotally connected to a bell-crank lever 31 rockable about the axis 7. The bell-crank lever 31 is also connected with the upper end of a rod 32, the lower end of which is pivoted to the forward end of the rod 15.

The mode of operation of the new arrangement is as follows:

When the lever 9 is shifted from the position which the parts assume in Fig. 1 by suitable transmission means, not shown, operated by the pilot, i. e., when the lever 9 is rocked about the axis 34, this movement is transmitted by way of the rod 13 to the lever 12 and thence to the rod 15 and by way of the latter to the arm 14 which is secured to the wing 1. In the retracted position of the two auxiliary wings lateral control is effected therefore with the wing 1 alone.

When the slide rail 5 is displaced rearwardly by suitable control means, not shown, the auxiliary wings 1 and 2 pass into the position illustrated in Fig. 2. Let it be assumed in the first place that the relative position of the remaining levers, rails and rods remains unaltered. If, then, the lever 9 is rocked, its movements are transmitted as above described only to the auxiliary wing 1, so that also in the protruded position of the two auxiliary wings lateral control is possible with the rear auxiliary wing alone.

If, however, the two auxiliary wings, when in protruded position, are rocked in common, then by suitable actuation of the lever 18 the rail 16 is swung parallel to itself downwards for a certain distance. At this time the bell-crank lever 27 turns in the bearing 26 in counter-clockwise direction. Thereby the rod 30 is moved to the left; the bell-crank lever 31 turns to the right; and the rod 32 and thus the left end of the rod 15 are drawn upwardly. At this time the said end is moved until it comes to be located coaxial with the right pivotal end of the rod 10. Further, by actuation of the bell-crank lever 20 the rail 17 is swung downwardly for a certain distance parallel to itself. Thereby also the rod 33 is moved downwardly and entrains the left end of the rod 10 so that the same is displaced in the slot of the lever 9 and passes into the position shown in Fig. 2.

If now the lever 9 is rocked about the axis 34, this movement is transmitted by way of the rod 10 to the arm 11 and thus to the auxiliary wing 2 which therefore turns about the axis 7. At the same time, however, the wing 1 is moved in the same direction without altering its position relatively to the wing 2, since, as already stated, the left end of the rod 15 is located coaxially with the right end of the rod 10 and therefore the rocking movement of the lever 12 effected by movement of the rod 13 is without influence on the rod 15.

The lateral control is thus effected by the two auxiliary wings acting in unison.

Finally, as shown in Fig. 3, it is also possible to shift the two auxiliary wings when in protruded position in opposite directions to one another by rotation about their axes. For this purpose the guide rails 16 and 17 are swung down by manual means until the levers and rods assume the position shown in Fig. 3, that is, until, as distinguished from Fig. 2, the left end of the rod 15 in the slot of the lever 12 comes to lie above the right pivoted end of the rod 10.

If now the lever 9 is rocked about the axis 34, for example, to the right, this movement is transmitted on the one hand by way of the rod 10 to the arm 11 and effects left-hand turning movement of the wing 2 and on the other hand by way of the rod 13 the movement is transmitted to the lever 12 and the rod 15 to the arm 14 and effects righthand turning movement of the wing 1.

I claim:

1. An aerofoil including a wing having a recess on the under side of its rearward portion, an auxiliary wing adapted to be faired in said recess, a second auxiliary wing disposed behind said first auxiliary wing, said auxiliary wings being mounted for upward or downward oscillation about an axis extending transversely to the direction of propulsion, means for securing said auxiliary wings in normal retracted position, or in protracted position in which said auxiliary wings are disposed rearwardly and downwardly of said main wing, means for actuating said securing means, and means for actuating only said second auxiliary wing upwardly and downwardly when in retracted position, and for actuating either or both the auxiliary wings upwardly and downwardly when in protracted position.

2. A supporting wing for aircraft including a main wing having a recess on the under side of its rearward portion, two auxiliary wings disposed one behind the other, each of said auxiliary wings being mounted for upward and downward rocking movement about an axis extending transversely to the direction of propulsion, means for protracting said auxiliary wings rearwardly of said main wing and for retracting said auxiliary wings to normal position in which the first auxiliary wing behind the main wing is faired in said recess and only the most rearward auxiliary wing can be rocked both upwardly and downwardly.

3. A supporting wing for aircraft including a main wing having a recess on the under side of its rearward portion, two auxiliary wings disposed one behind the other, and mounted for rocking movement about an axis transverse to the direction of propulsion, rails mounted for sliding movement relative to said supporting wing, the auxiliary wing adjacent the supporting wing being mounted on said rails, means for mounting the other auxiliary wing on the wing mounted on the rails, means for extending said rails to the rear of said supporting wing to protract said auxiliary wings rearwardly, or for retracting said rails to retract said auxiliary wings to a position in which the forward auxiliary wing is faired in said recess, arms mounted on the rails and on the auxiliary wings, levers interconnecting the arm on the rail and the arm on the forward auxiliary wing, push rods connecting the lever arm of the forward auxiliary wing with the arm of the rear auxiliary wing, swingable guide rails arranged within the supporting wing, said push rods being connected to said swingable guide rails, whereby by swinging the guide rails the rods are shifted to rock the auxiliary wings in the same or in opposite directions.

4. A supporting wing as claimed in claim 2, rails slidable relatively to the supporting wing, one of said auxiliary wings being secured to said rails, arms provided with levers and mounted on the rails and on the forward auxiliary wing, two push rods connecting said levers, a swingable guide rail, one of said push rods being articulated at its forward end to said swingable guide rail and being slidable within the lever of the slide rail, said rod being pivotally connected at its rear end to the arm of the forward auxiliary wing, the other rod being pivotally secured at its ends to said levers.

5. A supporting wing as claimed in claim 2, arms on said auxiliary wings, a push rod connecting said arms, a lever on an arm of the forward auxiliary wing, the forward end of said push rod being slidable within said lever.

6. A supporting wing as claimed in claim 2, arms on said auxiliary wings, push rods connected with said arms, guide rails mounted for swinging movement in the supporting wing, sliding members running in said guide rails, and link members connecting said push rods and said sliding members.

WALTER BLUME.